S. S. HEPWORTH.
Driving-Gear for Shafting.
No. 160,522. Patented March 9, 1875.
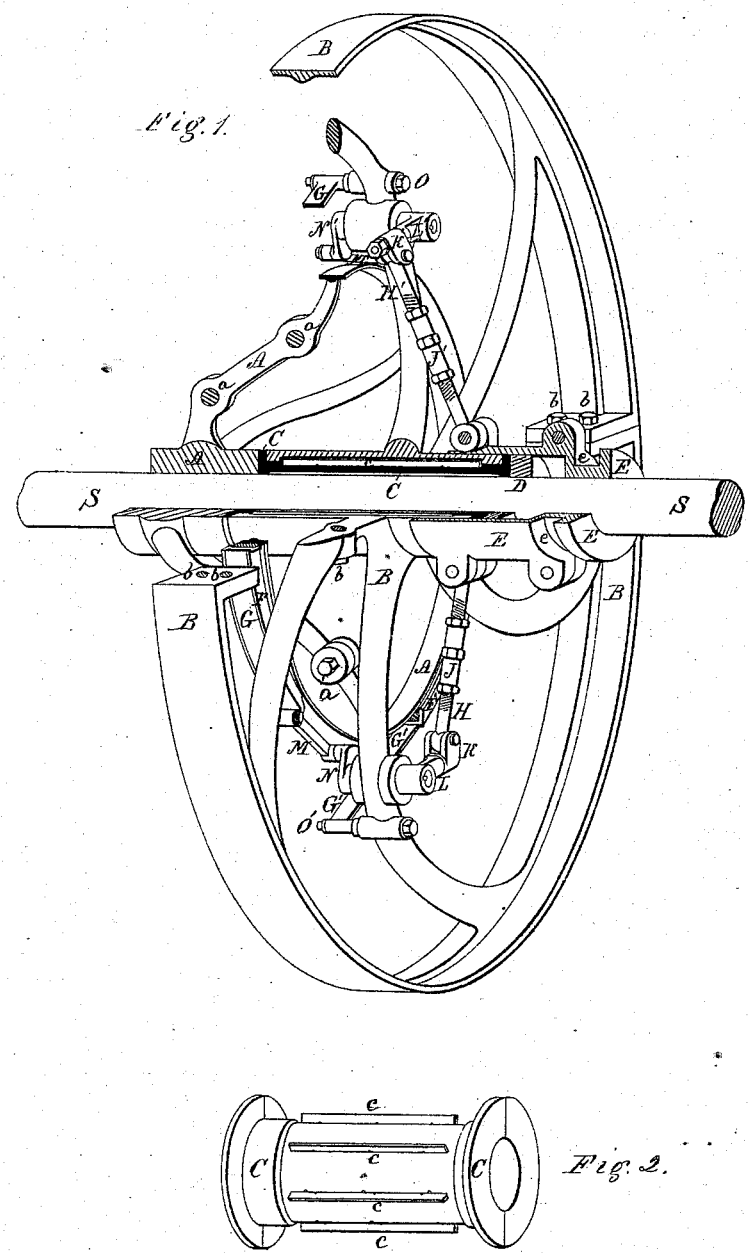

UNITED STATES PATENT OFFICE.

SAMUEL S. HEPWORTH, OF NEW YORK, N. Y.

IMPROVEMENT IN DRIVING-GEARS FOR SHAFTING.

Specification forming part of Letters Patent No. 160,522, dated March 9, 1875; application filed February 6, 1875.

*To all whom it may concern:*

Be it known that I, SAMUEL S. HEPWORTH, of New York, in the county and State of New York, have invented certain new and useful Improvements in Driving-Gear for Shafting; and I do hereby declare that the following is a full, clear, and exact description thereof, whereby a person skilled in the art can make and use the same, reference being had to the accompanying drawings and to the letters of reference marked thereon.

Like letters in the figures indicate the same parts.

My invention consists in the construction and arrangement of a driving-pulley and friction-clutch, which can be attached to a standing shaft, and which can readily be removed and replaced without disturbing the shaft.

In the accompanying drawing, Figure 1 is a perspective representation of my invention, with certain parts removed the better to show the interior construction. Fig. 2 is a view of the bushing of the loose pulley, which runs on the shaft.

A is a fixed pulley, which is made in halves, and bolted together with the bolts *a* after being placed upon the shaft S. It is clamped to the shaft, and revolves with it. B is a loose pulley, made in halves, and bolted together around the shaft with the bolts *b*. Within its hub is the metallic bushing C, the two halves of which are placed in position before the pulley B is bolted in place. Between the bushing C and the hub of B is an annular chamber for containing oil. When the pulley is revolving this oil is thrown outward against the circumference of the chamber; but when the pulley stops, some of the oil is caught by the wings *c*, which are uppermost, and passes down through small holes in the bushing C, to lubricate the bearing. The ends of the bushing rest against the hub of the pulley A, and a collar, D, fixed to the shaft S, to prevent end motion. G G' are metallic straps, attached at one end to opposite arms of the pulley B by means of the pins O O', and at the other ends they are attached to the cranks N N' by means of the connecting-rods M M'. Attached to the straps G G' are the cast-iron shoes or forms F F'. These shoes are hollow upon the inner side, and are filled with narrow strips of soft wood, usually pine, so that the end grain comes in contact with the rim of the pulley A. In order to secure this wood firmly in its place, and to give it a compact and durable surface, which will stand the wear and friction of the pulley A for a long time, it is driven full of common shoe-pegs. L L' are levers, keyed to the shafts of the cranks N N'. They have at their ends the universal joints K K', connecting them, by means of the rods H H', with the sliding sleeve E. This sleeve E moves back and forth upon the shaft S by means of a lever running in the groove *e*, in the usual manner, and forms, in connection with the rods H H', a toggle for pressing outward the ends of the levers L L'. The rods H H' are provided with an adjusting-nut for regulating their length, so that when the sleeve E is pushed toward the collar D, the friction-straps G G' press the wooden packing with sufficient force against the rim of the pulley A. This adjusting mechanism is shown at J J' in Fig. 1.

My invention can be used to connect and disconnect the shaft S and pulley B when either is driven by the other.

When the sleeve E is pushed toward the pulley B the motion of the cranks N N', caused by the pressing outward of the ends of the levers L L', draws the friction-bands tightly against the rim of the pulley A, and the parts all move together. When the sleeve E is moved back, the friction-bands are released, and the parts A and B are free to move independently.

My invention can be applied to any shaft without removing it from its bearings, and all parts can be removed or replaced with facility, when required to be renewed or repaired, as the pulleys A and B, the bushing C, and the sleeve E are all made in two parts and placed upon the shaft before being secured together.

What I claim as my invention is—

1. The devices A B E, each constructed in two opposite and symmetrical parts, which can be united around a shaft, in combination with friction-bands constructed in two parts, and operated by toggles and cranks, substantially in the manner herein described.

2. The friction-packing in the forms F F', composed of the end grain of soft wood filled with shoe pegs driven into it, substantially as herein described.

3. The bushing C, with its wings c and holes for passing oil to the shaft, substantially as herein described.

SAMUEL S. HEPWORTH.

Witnesses:
 THEO. G. ELLIS,
 WENDELL R. CURTIS.